United States Patent Office 2,976,163
Patented Mar. 21, 1961

2,976,163
EMULSIFYING POLYMER OILS

Russell D. Bitting, Hilliards, Ohio, Kenneth E. Jackson, Bethel Borough, Pa., and Louis J. Nowacki, Bexley, Ohio, assignors to Esso Research and Engineering Company, a corporation of Delaware No Drawing. Filed Oct. 8, 1954, Ser. No. 461,292

5 Claims. (Cl. 106—141)

This invention relates to coating compositions and more particularly to processes for producing stable water-reducible emulsion varnishes and paints.

Water paints range from those composed of water, pigment and an adhesive binder such as casein or similar protein, to the more advanced types which contain an oleoresinous film-forming component capable of providing a water-resistant pigmented film. Of the latter type, there are oil-in-water emulsions and there are water-in-oil emulsions, both being water-reducible to lower solids contents at which stage they are both oil-in-water emulsions.

Stable water-reducible paints are difficult to prepare and a marketable product represents a high order of coordination of materials and properties, since the emulsion must be stable for extended periods of time under wide variations in treatment and handling; i.e. it should be stable when allowed to stand for weeks and preferably for months at high summer temperatures; it should be stable enough to be applied in usual manners as by brushing, spraying, etc.

In copending application, Serial No. 419,927 filed March 30, 1954, in the name of Kenneth E. Jackson, there is disclosed and claimed a water-thinnable coating composition having a high degree of washability prepared from oily homopolymers of butadiene and copolymers of butadiene and styrene. However, the oily polymers used in the formulations of that application contained 9% volatile solvent which is undesirable due to the odor characteristics of the solvent and possible instability when the emulsion is mixed with other resin emulsions. Accordingly, therefore, it is desirable to use oily polymers or copolymers which have been stripped of their volatile content and contain substantially 100% non-volatile matter (N.V.M.).

However, in the course of the investigations of colloid-stabilized emulsion systems containing oily polymers of butadiene or copolymers of butadiene and styrene dispersed as a discontinuous phase in water, it has been found that the emulsifiers which were useful in connection with the 91% N.V.M. oily polymers and copolymers are not suitable with the 100% N.V.M. product.

The present invention, therefore, resides in the discovery that only a special type of emulsifier permits the use of the liquid polymer oils of 100% N.V.M. which results in emulsions having improved stability and in the paint films prepared therefrom being free of tack. On the basis of this discovery it has been found possible to prepare stable water-reducible emulsion varnishes and paints. However, it must be borne in mind that there are other conditions, known to the art, which must be concurrently provided to accomplish these results.

It is desirable, although not necessary, that the size of the particles of the film-forming polymer oil in the emulsion be finer than about one-half micron. A minor percentage of the particles may be as large as about five microns.

Another desirable condition is that the size of the colloid particles be not substantially greater than about one micron. Casein, soya protein or other alkali-soluble protein which has been peptized or dispersed in alkaline solutions generally has such a satisfactory particle size.

From what has been said above it should be evident that the present invention comprises a water-reducible emulsion coating composition which contains the following ingredients:

(1) An organic polymer oil film-forming material having the characteristics of a varnish.
(2) A specific non-ionic wetting agent.
(3) Water.
(4) A protective colloid, such as an alkali-soluble protein colloid (e.g. soya protein or other vegetable or animal protein) or other organic colloids such as methylcellulose, carboxymethyl-cellulose, etc.
(5) A thickener to give body to the emulsion.
(6) Pigment, when paints are desired. The pigment is omitted, of course, when the emulsion is intended to deposit a clear varnish film.

The above ingredients will be discussed individually to indicate the characteristics, attributes, properties, etc., which it is desired to have in the respective ingredients. Furthermore, the proportions which each ingredient should bear to the others will also be pointed out.

1. The polymer-oil film-forming material

The synthetic drying oils of this invention are obtained by copolymerizing 60 to 100 parts of butadiene-1,3 with 40 to 0 parts of styrene, preferably about 75 to 85 parts of the former and 25 to 15 parts of the latter, the polymerization being carried out at 20 to 100° C., preferably below the melting point of the catalyst or between 65 and 85° C., in a reaction diluent. Temperatures near the lower end of the range set forth are generally more suitable for batch polymerizations and temperatures near the upper end of the range are particularly suited for continuous operation. As a polymerization catalyst about 0.1 to 10 parts, preferably about 1 to 3 parts of a finely dispersed metallic sodium catalyst is used in the optional presence of various polymerization modifiers which tend to promote the reaction and produce colorless products of more exactly reproducible drying rates. As reaction diluent it is desirable to use, for example, a naphtha having a boiling range between about 90 and 120° C. or straight-run mineral spirits such as Varsol (boiling range 150 to 200° C.), inert hydrocarbon diluents such as butane, xylene, benzene, toluene, cyclohexane or the like, individually or in admixture with each other. To be suitable for the polymerization reaction here involved, the diluents should have a boiling range within the limits of about —15° C. and 200° C. The diluents are usually used in amounts ranging from 50 to 500, preferably 200 to 300 parts per 100 parts of monomers.

Instead of using inert diluents, it is also possible to use modifying diluents such as butene-2- or other low boiling olefins which modify the reaction by limited copolymerization and chain termination. Various ethers having more than two carbon atoms per molecule such as diethyl ether, diisopropyl ether, dioxane, vinyl ethyl ether, vinyl isopropyl, vinyl isobutyl ether, anisole, phenetole and other ethers of various types are also useful as diluents and are particularly helpful as co-diluents to insure formation of colorless products when used in amounts ranging from about 10 to 35 parts per 100 parts of monomers, together with the aforesaid amount of inert diluent such as solvent naphtha, p-dioxane, m-dioxane, and their various methyl and ethyl homologues are particularly preferred. In selecting the ether co-diluent it is especially desirable to select an ether having a boiling point at least 10° C. below the lower limit of the boiling range of the hydrocarbon diluent and thus, when using Varsol, ether co-diluents boiling between about 25 and 140° C. are preferred in order to permit its ready recovery from the polymerized reaction mixture.

Other means of modifying the properties of the polymer product involve the substitution of all or at least part of the butadiene feed with other diolefins such as isoprene, 2,3-dimethyl butadiene-1,3, piperylene or 2-methyl pentadiene-1,3. Likewise, styrene may be replaced by its various ring-alkylated homologues such as the various methyl styrenes, dimethyl styrenes, ethyl styrenes or diethyl styrenes. In particular it is desirable to add the styrene monomer to the reaction mixture only after the polymerization of the butadiene has been initiated. By this expedient, the induction period is quite substantially reduced, and the polymer produced is gel-free and of desirably low viscosity as opposed to a more viscous product obtained when the styrene monomer is present in the reaction mixture from the beginning.

Especially where a coarse dispersion of sodium is used as catalyst, it is also advantageous to use about 1 to 50%, preferably 10 to 20% based on sodium of a $C_1$ to $C_5$ aliphatic alcohol. Secondary and tertiary alcohols, particularly isopropanol or tertiary butanol are preferred. Such alcohols act as polymerization promoters and, depending on the degree of catalyst dispersion, have a more or less pronounced effect on the intrinsic viscosity of the resulting product. The reaction time and induction period also vary depending on the degree of catalyst dispersion and reaction temperature, the reaction time ranging from about 40 hours with a coarse catalyst at about 50° C. to about 15 minutes at about 100° C. with a catalyst particle size of less than 100 microns diameter. While sodium is preferred similar catalysts such as potassium, sodium hydride, and various alloys of sodium are also useful. Agitation of the reaction mixture during synthesis increases the efficiency of the catalyst. Conversions of 50 to 100% on monomers can be accomplished fairly readily in batch-type as well as in continuous polymerizations, although the catalyst requirements are twice or three times greater for continuous operation than for a batch operation and equal conversion.

Destruction of catalyst at the end of the reaction is effectively accomplished by adding to the reactor a moderate excess of alcohol, e.g. 100% excess of isopropanol based on sodium, and agitating at the reaction temperature for another half hour or so. After destruction of the residual sodium by alcohol the crude product containing the alcoholate, excess alcohol and other solid impurities is cooled, neutralized with dry carbon dioxide, glacial acetic acid or other preferably anhydrous acid which does not affect the polymer, and the neutralized product is then filtered with a filter aid such as silica gel, clay, charcoal or its equivalent.

In the preferred modification the clear colorless filtrate is then fractionally distilled to remove first the alcohol-hydrocarbon azeotropes and then the dioxane-hydrocarbon azeotropes. Finally, if the polymerization is carried out in a relatively large amount of hydrocarbon diluent so that the resulting polymer solution is too dilute for use as a varnish or enamel base, it is desirable to distill off additional hydrocarbon until a product containing the desired non-volatile matter is obtained, e.g. 50–90% N.V.M., the non-volatile matter being the polymeric drying oil. The resulting product, being a solution of polymeric drying oil in a suitable hydrocarbon solvent such as solvent naphtha or mineral spirits, is a clear, colorless varnish composition having a viscosity between about 0.5 and 5 poises at 50% non-volatile matter. The Staudinger molecular weight of the non-volatile or polymeric constituents of the product usually falls between about 2,000 to 5,000, corresponding to an intrinsic viscosity of about 0.15 to 0.3. For the purposes of this invention it is generally desirable to strip most of the solvent off leaving a non-volatile content of about 100%.

2. The emulsifier

The emulsifier of this invention is a polyoxyethylated alkyl phenol having the formula $RC_6H_4(OCH_2CH_2)_nOH$ where R is an alkyl radical of 6 to 12 carbon atoms and $n$ is an integer of at least 8, preferably 9 to 100. Expressed another way, the ethylene oxide units should represent at least 60% of the total molecular weight of the compound, preferably between 63 and 95%. These compounds are suitably prepared by condensing an alkyl phenol with ethylene oxide. If desired the emulsifier may be used in conjunction with a fatty acid, but this is not necessary. When used the fatty acids include any of the higher fatty acids having 8 to 34 carbon atoms in the molecule. A particularly excellent commercial emulsifier falling in this definition is Igepal-630 manufactured by Antara Chemical Division, General Aniline & Film Corp. This material is a polyoxyethylated nonylphenol in which the number of ethylene oxide units is 9 and represent 63% of the total weight of the molecule.

The amount of emulsifier must be maintained between 2 and 5% based on the total emulsion in order to obtain a stable emulsion.

3. Water

It is preferred to use distilled water or natural soft water but most waters suitable for human consumption can be used. Hard waters may require preliminary chemical treatment to precipitate the polyvalent minerals thereof in the form of stable compounds which will remain inert to the emulsion ingredients if the precipitated compounds are left in the completed emulsion. The amount of water contained in the emulsion prior to its application as a coating material is not critical so long as there is enough water present to produce a stable water-reducible emulsion. The emulsion may then be reduced at the time of application by adding whatever water is desired to provide a good working consistency. Alternately reduction to a solids content of about 55% is satisfactory, but greater or less reduction may be used. In preparing the emulsion, part of the total water content is advantageously derived from the colloid dispersion, and part may be derived from other similar solutions.

4. The protective colloid

The protective colloid may be casein or soya protein alone or in mixture with each other, with or without minor additions thereto of alginates or other organic protective colloids or other alkali-soluble proteins or mixtures of proteins with each other or with other organic colloids.

Dispersions of proteins in water are usually prepared separately from the emulsion by using any of the usual "cutting" or dispersing methods and reagents. However, since the alkalies generally used for such purposes ultimately are deposited in the dry film of coating composition and impair its water resistance, it is preferred to use as little of such alkalies as possible and to supplement such alkalies with hydroxy amines. The dispersions may be made up to contain from about 17.5% to 18% total solids, with about 14% protein, but more or less concentrated dispersions may be employed since the concentration thereof only affects the amount of water which is added otherwise in preparing or applying the completed emulsion. The total weight of protective colloid should preferably not be greater than about one-sixth of the weight of the film-forming materials. Such large concentrations are seldom necessary in a system to effect the necessary stabilization of the emulsion and it is preferred to keep the concentration as low as practicable to provide sufficient stability. As little protein colloid as 5% by weight of the varnish may frequently be adequate for this purpose, but it is generally preferred to use between about 8% and 12% on a weight basis. When non-proteinaceous colloids are used, the minimum concentration varies with particular colloid and is best determined by experiment, as described below. Two percent or more of methylcellulose has been found suitable.

5. Thickener

The primary purpose of the thickener solution is to give body to the paint. However, it also acts as a protective colloid. Often, one material is satisfactory to serve the dual purpose of protective colloid and thickener. However, when the protective colloid does not increase body sufficiently, an additional thickening material may be added. Materials used for these purposes may be either natural or synthetic. Natural types include such materials as casein, protein, starch, alginates, and zein. Synthetic types include such materials as methyl cellulose, polyvinyl alcohol, and sodium salts of polyacrylates. They are used in amounts varying from about 2 to 20% based on the vehicle solids.

6. Pigment

In formulating the emulsion paints, it is desirable to use high-hiding pigments. Titanium dioxide is such a pigment and is very satisfactory, particularly because it is also a relatively inert pigment. In brief any pigment commonly used in paint and which is not alkali-reactive is suitable. It is preferred to use pigments such as lithopone, titania, cadmium sulfide colors, cadmium sulfoselenide colors, iron oxide colors and ultramine blues, and as indicated, the high-hiding pigments of these classes and types are preferred particularly. Inert fillers may also be used for their usual purpose as bulking agents to lower the cost of the paint.

The emulsion paints of this invention are pigmented in respect to the polymer oil or film-former content in about the same proportions customarily used in oil paints; that is, a pigment varnish ratio of up to about 1 volume of pigment to about 1 volume of film-former may be employed. If lower specular gloss is desired, then the ratio of pigment to film-forming material may be increased.

Preparing the emulsion

It is generally desired to prepare separately (1) the emulsion of the polymer oil with a part of the total water, (2) the stabilizing colloid dispersion, (3) the pigment dispersion and (4) the thickener. These are then mixed in the following approximate proportions:

|  | Wt. percent |
|---|---|
| Pigment dispersion | 45–55 |
| Protective colloid: |  |
| Protein solution | 5–15 |
| or Organic colloid | 2–8 |
| Polymer emulsion | 20–30 |
| Thickener solution | 7–10 |
| Water, balance. |  |

The advantages of the invention will be better understood from a consideration of the following experimental data which are given for the sake of illustration, but without intention of limiting the invention thereto.

EXAMPLE 1

The following separate dispersions and solutions were prepared:

Pigment dispersion: Pts. by wt.
| Ti Pure R-110 | 121.5 |
|---|---|
| Ponolith LRW | 97.3 |
| A.S.P. 900 china clay | 146.0 |
| Water | 142.0 |
| Tween No. 21[1] | 0.6 |
| Tributyl phosphate—ground 15 minutes in gallon friction top can with ceramic pebbles, using a "Red Devil" paint mixer | 1.2 |
| Water—added to mill and mixed four minutes to facilitate removal of charge | 63.4 |
|  | 572.0 |

[1] A sorbitan monovalent polyethylene derivative manufactured by the Atlas Powder Co.

The above pigment dispersion contained 64.3 percent N.V.M.

Protein solution: Pts. by wt.
| Water | 87.0 |
|---|---|
| Alpha protein stirred in | 16.1 |
| NH₄OH (26 Bé.) | 1.6 |
| Dowicide G (added after above ingredients were completely dissolved) | 2.8 |
|  | 107.5 |

The above solution contained 17.5 percent N.V.M.

Thickener solution: Pts. by wt.
| Acrysol GS (12.5 percent N.V.M.) | 14.10 |
|---|---|
| Water | 70.06 |
| Dowicide G | 0.44 |
|  | 84.6 |

The above solution contained 2 percent N.V.M.

Polymer oil emulsion:[1]
| Polymer oil (100 percent N.V.M.) | 137.4 |
|---|---|
| Igepal 630, 10% | 6.87 |
| Soya fatty acids, 10% | 6.87 |
| 6 percent Co drier in form of naphthenate (0.01 percent of polymer oil solids) | 0.236 |
| 0.06 percent Mn drier in form of naphthenate (0.001 percent of polymer oil solids) | 0.236 |
| Above ingredients mixed thoroughly—water added gradually [2] | 123.7 |
|  | 277.436 |

[1] A polymer oil having a viscosity of 1.5 poise at 50% N.V.M. in Varsol prepared from the following recipe with all volatile solvents removed to produce essentially 100 percent non-volatile material before emulsifying:

Parts by wt.
| Butadiene | 80 |
|---|---|
| Styrene | 20 |
| Varsol | 200 |
| Isopropanol | 0.2 |
| Dioxane | 20 |
| Sodium | 1.5 |
| Temperature, 50° C. |  |

[2] Water is added gradually forming a water-in-oil emulsion until it reaches the point of inversion to an oil-in-water emulsion. Just prior to this inversion the mixture is a thick paste; after the inversion, water is added rapidly.

The above emulsion contained 55 percent N.V.M.

The above formulae were combined and additional water was added to prepare an emulsion paint in accordance with the following recipe:

Parts by wt.
| Pigment dispersion | 572 |
|---|---|
| Protein solution | 107.5 |
| Polymer oil emulsion | 277.4 |
| Thickener solution | 84.6 |
| Water | 145.9 |
| Total | 1,187.4 |

The resulting paint contained 45.5% N.V.M. and had a viscosity of 5.7 Krebs units (27 sec. using a 100 g. wt.) at 25° C.

EXAMPLE 2

An emulsion paint was prepared in accordance with Example 1, except that a five percent methyl cellulose solution was substituted for the protein solution and the thickening solids were increased. The recipe used is as follows:

Parts by wt.
| Pigment dispersion | 572.0 |
|---|---|
| Protective colloid (5% methyl cellulose solution) | 92.1 |
| Thickener solution | 100.0 |
| Polymer oil emulsion | 277.4 |
| Total | 1,041.5 |

The resulting paint contained 50.8% N.V.M. and had a viscosity of 93 K.U. (27 sec. using at 300 gt. wt.) at 25° C.

EXAMPLE 3

The polymer oil of Example 1 was emulsified in accordance with the formula of Example 1 except that the fatty acids were omitted and the emulsifier was used in varying amounts. After preparation, the emulsion was set aside for stability testing. The following results were obtained:

| | Percent of Emulsifier [1] | Particle Size of Emulsion | Stability |
|---|---|---|---|
| 1 | 0.26 | Too large | Separated after 4 hours. |
| 2 | 1.25 | ____do____ | |
| 3 | 2.44 | OK | Stable. |
| 4 | 4.80 | OK | Do. |
| 5 | 9.1 | Too large | Separated after 24 hours. |
| 6 | 5.0+5% fatty acids. | OK but larger than 3 and 4. | Stable. |

[1] Based on polymer oil.

The above data show that the emulsifier can be used without the concurrent use of fatty acids but only in amounts between about 2 and 5% if a stable emulsion is desired. Furthermore, when these emulsions as well as the emulsion of Example 1 were drawn out on a glass plate and dried, the varnish containing the fatty acid of Example 1 dried to a wrinkle finish while the fatty-acid free varnishes dried to a smooth finish.

EXAMPLE 4

The polymer oil of Example 1 was emulsified in accordance with the formula of Example 3 using 2.44% of the emulsifier based on the polymer oil, except that the emulsifier was replaced with other non-ionic, anionic, and cationic wetting agents as shown below. Either the polymer oil was not emulsified or if emulsified the resulting emulsion was highly unstable, that is, it separated in 24 hours or less. The following results were obtained:

| Emulsifier | Emulsified | Stability |
|---|---|---|
| Glim [1] | Yes | Separated after 24 hours. |
| Triton X-100 [2] | Yes | Do. |
| Santomerse S [3] | No | |
| Areskap 50 [4] | No | |
| Alkaterge C [5] | No | |

[1] An ethylene oxide condensation product of a phenol (nonionic) manufactured by B. T. Babbitt, Inc. and containing less than 8 ethylene oxide units.
[2] An ethylene oxide condensation product of octyl phenol manufactured by the Rohm and Haas Co. and containing 8 to 10 ethylene oxide units.
[3] An alkyl aryl sodium sulfonate manufactured by Monsanto Chemical Co.
[4] A monobutylphenyl phenol sodium monosulfate (anionic) manufactured by Monsanto Chemical Co.
[5] A substituted oxazoline (cationic).

EXAMPLE 5

The polymer oil of Example 1 was heated to 125° F., 6 grams of oleic acid was stirred in. A solution of 3 grams of ethanol amine in 106 grams of water was then heated to 125° F. and gradually stirred in the polymer oil. No emulsion was obtained.

Similar attempts with Dresinate 731, 2-methyl-2-amino-1-propanol and fatty acids, and Turkey red oil either failed to prepare an emulsion or the emulsion proved to be too unstable. For example, a mixture of 2-methyl-2-amino-1-propanol and fatty acids gave an emulsion having too large particle size to remain stable.

The above examples show that the use of 2.0 to 5.0 wt. percent, based on the polymer oil, of a polyoxyethylated nonyl phenol having at least 8 ethylene oxide units is the only material which has been found to form emulsions of a liquid polymer of butadiene or copolymer of butadiene and styrene which remain stable.

It will, of course, be obvious that the quantities and kinds of pigment shown in the examples may vary very widely, depending upon the color desired. In the case of color, certain colored pigments or even color lakes may be used.

Except for such equivalents as may occur to those skilled in the art and the adoption of such mechanical expedients as mixers, paint mills, etc. to insure adequate and uniform admixture of the various ingredients, the invention claimed is:

1. A process for preparing an emulsion which comprises adding 2 to 5 weight percent of a polyoxyethylated nonyl phenol containing at least 8 ethylene oxide units to an oily polymer of 60 to 100% butadiene-1,3 and 40 to 0% styrene which polymer has been stripped of all volatile material and agitating the mixture with water until an emulsion is formed.

2. A process according to claim 1 in which methyl cellulose in the amount of at least 2 wt. percent based upon oily polymer is added to the emulsion as a protective colloid.

3. Process according to claim 2 in which the protective colloid is 5 to 16⅔ weight percent of an alkali-soluble protein.

4. Process according to claim 1 in which the emulsifier is polyoxyethylated nonylphenol containing 9 ethylene oxide units.

5. Process according to claim 1 which includes pigment in an amount less than that corresponding to a pigment to varnish ratio of 1 to 1 by volume.

References Cited in the file of this patent

UNITED STATES PATENTS

| 2,595,797 | Leyonmark | May 6, 1952 |
| 2,669,526 | Koenecke | Feb. 16, 1954 |
| 2,677,800 | Jackson et al. | May 4, 1954 |
| 2,684,984 | Cross | July 27, 1954 |
| 2,692,254 | Groves et al. | Oct. 19, 1954 |

OTHER REFERENCES

"Antara Chemicals," Catalogue, Mar. 20, 1953, page 11.